(12) United States Patent
Al-Saiari et al.

(10) Patent No.: US 12,233,544 B2
(45) Date of Patent: Feb. 25, 2025

(54) SMART EXTENDABLE TELESCOPIC POLE FOR DEPLOYMENT OF MINIATURE INSPECTION CRAWLERS

(71) Applicant: SAUDI ARABIAN OIL COMPANY, Dhahran (SA)

(72) Inventors: Hamad Al-Saiari, Thuwal (SA); Fadl Abdellatif, Thuwal (SA); Sahejad Patel, Thuwal (SA); Ahmed Brahim, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 146 days.

(21) Appl. No.: 18/304,927

(22) Filed: Apr. 21, 2023

(65) Prior Publication Data

US 2024/0351187 A1    Oct. 24, 2024

(51) Int. Cl.
*H02J 7/00* (2006.01)
*B25J 5/00* (2006.01)
*B25J 18/02* (2006.01)
*B25J 19/02* (2006.01)

(52) U.S. Cl.
CPC ............. *B25J 5/007* (2013.01); *B25J 18/025* (2013.01); *B25J 19/021* (2013.01)

(58) Field of Classification Search
CPC ......... B25J 5/007; B25J 18/025; B25J 19/021
See application file for complete search history.

(56) References Cited

U.S. PATENT DOCUMENTS

| | | |
|---|---|---|
| 5,737,847 A | 4/1998 | Britton |
| 6,026,970 A | 2/2000 | Sturm, Jr. et al. |
| 8,773,525 B2 | 7/2014 | Lortie |
| 9,739,792 B2 | 8/2017 | Atwood et al. |
| 10,307,199 B2 | 6/2019 | Farritor et al. |
| 11,307,063 B2 | 4/2022 | Low et al. |

(Continued)

FOREIGN PATENT DOCUMENTS

| | | |
|---|---|---|
| CN | 103057679 A | 4/2013 |
| CN | 108265816 A | 7/2018 |
| WO | 2022149173 A1 | 7/2022 |

OTHER PUBLICATIONS

Ismail et al.; Design and Development of Platform Deployment Arm (PDA) For Boiler Header Inspection at Thermal Power Plant by Using the House of Quality (HOQ) Approach; Science Direct, Procedia Computer Science 2017; 8 pages.

*Primary Examiner* — Muhammad S Islam
(74) *Attorney, Agent, or Firm* — Leason Ellis LLP (57) ABSTRACT

A system for deploying a magnetic robotic crawler onto a surface of an elevated asset, the crawler being of the type that is capable of magnetically attaching to and traversing the surface. The system comprises an extendable pole having a proximal end and a distal end. The system also comprises a docking station having a housing for receiving the crawler. The docking station is provided at the distal end of the pole. The docking station also includes magnetic feet mounted at a distal end of the housing and configured to magnetically couple with the surface. The system can also comprise an extendable pole having a proximal end and a distal end and an end effector attached to the distal end. Specifically, the end effector is configured to selectively attach to and detach from a complementary shaped receiver provided on the crawler.

18 Claims, 8 Drawing Sheets

(56) References Cited

U.S. PATENT DOCUMENTS

2016/0268823 A1\* 9/2016 Gonzalez ................. F17D 5/00
2021/0396842 A1  12/2021 Li et al.
2023/0034243 A1   2/2023 Ceborahs et al.

\* cited by examiner

SMART EXTENDABLE TELESCOPIC POLE FOR DEPLOYMENT OF MINIATURE INSPECTION CRAWLERS

FIELD OF THE DISCLOSURE

The present disclosure relates to mobile robots, in particular to systems for deploying and facilitating the operation of mobile robots for the inspection of industrial complexes.

BACKGROUND OF THE DISCLOSURE

Mobile robots can play an integral role in the inspection of industrial complexes. Inspection of elevated assets, including pipes and vessels, is typically done manually by an inspector using a handheld UT (ultrasonic testing) sensor to measure wall thickness. This requires the erection of scaffolding to allow accessibility to the points of interest on the asset. Scaffolding poses safety hazards (e.g. falling risk) and incurs significant cost to erect for every inspection job.

In the energy industry, most assets are made of ferromagnetic materials such as carbon steel. Therefore, usage of magnetic crawling robots (crawlers) is gaining traction, which promise to reduce reliance on scaffolding. These crawlers are used for visual inspection as well as ultrasonic thickness measurements for gauging the integrity of the assets such as piping networks. Such crawlers can be deployed on the pipe on a spot close to the ground and then driven remotely to climb up the pipe and reach the elevated spots that need to be inspected, without the need to erect scaffolding. Another method is to deploy the crawler on a spot that in spite of being elevated is still reachable/accessible through an access ladder, and then drive the crawler to the inaccessible spot to be inspected.

However, there remain many pipe sections which are not accessible to magnetic crawlers due to obstacles in their path which cannot be easily overcome, such as flanges and valves, making it not possible to reach the desired inspection spots. Therefore, in many cases, these crawlers cannot reach all the required inspection spots. In other cases, some inspection spots could be accessed only through a different and longer path that avoids obstacles, making the inspection process time consuming.

The present disclosure addresses these and other limitations associated with the efficiency of conventional mobile robots and inspection protocols.

SUMMARY OF THE DISCLOSURE

According to a first aspect of the disclosure, provided herein is a system for deploying a magnetic robotic crawler onto a surface of an elevated asset, the crawler being of the type that is capable of magnetically attaching to and traversing the surface. In particular, the system comprises an extendable pole having a proximal end and a distal end. The system also comprises a docking station having a housing for receiving the crawler, the docking station provided at the distal end of the pole. The docking station also includes magnetic feet mounted at a distal end of the housing and configured to magnetically couple with the surface.

According to a further aspect, provided herein is a system for deploying a magnetic robotic crawler onto a surface of an elevated asset, the crawler being of the type that is capable of magnetically attaching to and traversing the surface. The system comprises an extendable pole having a proximal end and a distal end. The system further comprises an end effector mounted to the distal end of the pole and configured to selectively attach to and detach from a complementary shaped receiver provided on a top side of the crawler.

These and other aspects, features, and advantages can be appreciated from the accompanying description of certain embodiments of the disclosure and the accompanying drawing figures and claims.

DETAILED DESCRIPTION CERTAIN OF EMBODIMENTS OF THE DISCLOSURE

According to one or more embodiments, systems for deploying mobile robotic inspection crawlers onto elevated steel assets and structures is disclosed. The system can comprise an extendable telescopic pole useable to deploy the mobile robotic inspection crawler ("crawler" or "robot") onto an elevated structure, such as a pipe, as well as retrieve it. The crawler can be designed in a way that is compatible with the telescopic pole for successful deployment and re-docking of the crawler. Further described herein are exemplary designs and variations of the telescopic pole, its end effector, which can include a docking station where the crawler can be held and be deployed from, an optional base carrier provided on the ground and configured to hold the telescopic pole, as well as other features.

Figure 1:
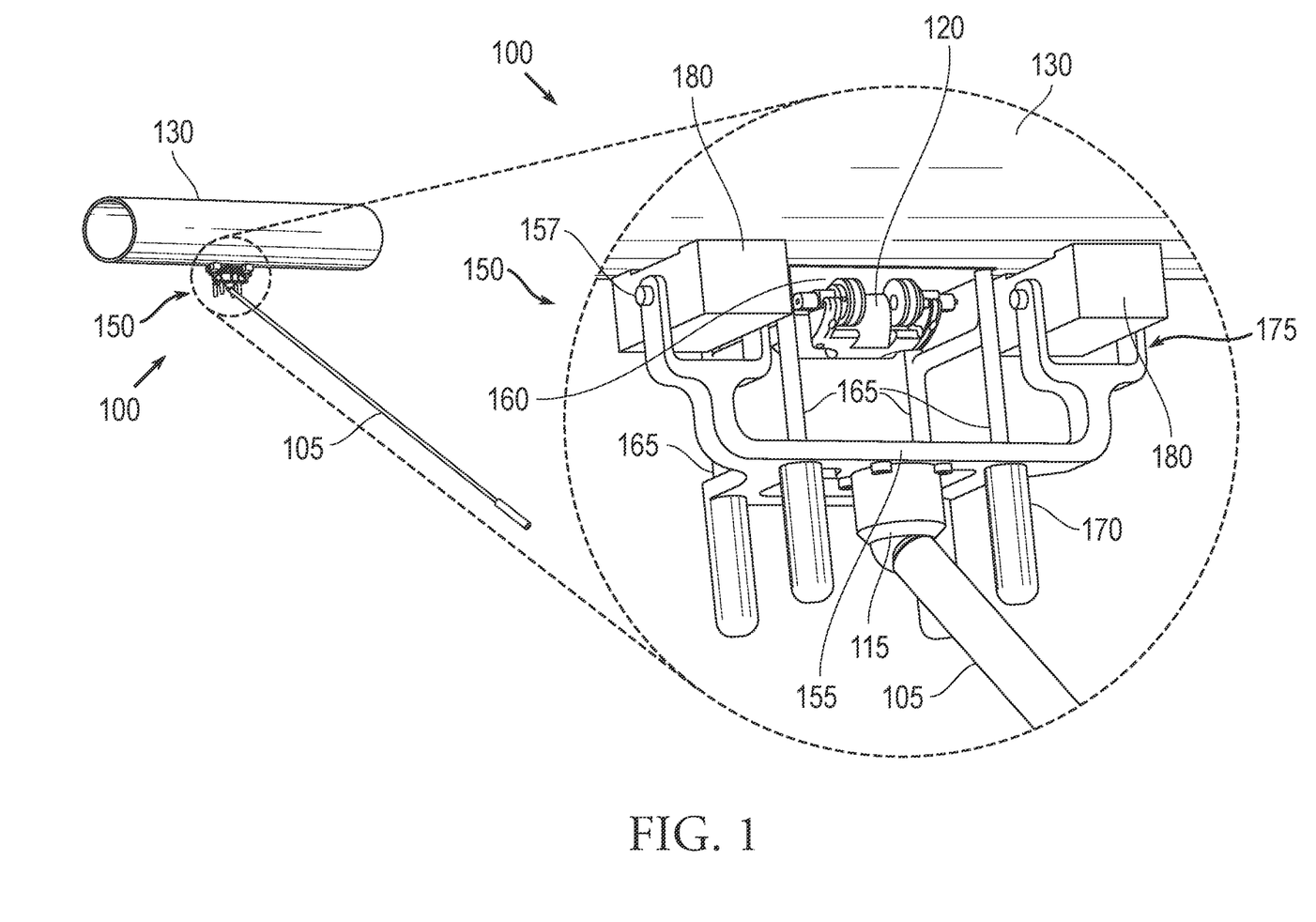
FIG. 1 is a perspective view of a mobile robot deployment system, including a telescopic pole and end-effector docking station and a mobile robot in accordance with an embodiment of the present application.

An example embodiment of the mobile robot deployment system 100 is shown in FIG. 1. The system 100 includes an extendable pole 105. The pole is, for example, a telescopic pole that is adjustable in length. The pole has a proximal end and a distal end and, in an example configuration, is intended to be held by an operator at a proximal end. Provided at the distal end of the pole is a docking station 150 within which the crawler 120 can be positioned.

In an embodiment, the pole 105 can be coupled to the docking station 150 using any of a variety of known mechanical couplings mechanisms. For example, as shown in FIG. 1, the joint comprises a ball and socket joint 115, wherein the socket is mounted to the proximal side of the docking station and a ball provided at the end of the pole is held in the socket and configured to rotate within the socket. The ball and socket joint 115 thus can enable the end frame to pivot and rotate relative to the pole and facilitates coupling the docking station to the asset 130.

The magnetic inspection crawler 120 is just one example of a crawler that is useable with the system 100. A magnetic crawler with magnetic wheels can allow it to move in inverted fashioned along the bottom side of a horizontal pipe, and stay fixed to a platform within the docking station even while it is deployed in an inverted fashion along the bottom side of a horizontal pipe. It should be understood that mobile robotic inspection crawlers are well known in the art and various types of inspection crawler can be used with the various deployment systems described herein. More generally, where certain elements of the present embodiments can be partially or fully implemented using known components, only those portions of such known components that are necessary for an understanding of the present embodiments are described, and detailed descriptions of other portions of such known components are omitted so as not to obscure the embodiments.

The docking station 150 can comprise an end-effector frame 155 that provides a housing that encompasses an interior volume of the docking station and provides structure for supporting the various components of the docking station. As shown in FIG. 1, the frame 155 can be shaped to define two legs 175 that extend distally away from a main body of the frame coupled to the pole 105. A magnetic foot 180 is mounted at the distal end of each of the two legs 175. The magnetic feet 180 are used to anchor the frame to the elevated asset 130 with the metallic platform, as further described herein, positioned against the elevated structure. The magnetic feet can be moveably joined to the legs of the end-effector frame using a mechanical coupling. For example, the coupling can comprise a through bolt or pin 157 configured to allow the foot 180 to pivot relative to the frame 155 and thus adapt to curved or uneven surfaces of the asset. Other suitable mechanical couplings could be used.

In certain embodiments, the frame 155 can be configured to house components therein but otherwise lack an interior volume but still can engage with the crawler when the crawler is docked.

In an embodiment, the magnetic feet 180 comprise switchable magnets that can be switched on or off to respectively couple and uncouple the docking station to the asset 130. Although not shown, buttons or any suitable switching mechanism for operating the switchable magnet system, as would be understood by those in the art, can be provided near the proximal end of the pole. It should be understood that, although the embodiment of FIG. 1 depicts two magnetic legs, any number of such magnetic legs can be provided (e.g. four or eight) depending on the size of the crawler and surface curvature of the asset(s) intended to be inspected.

Mounted to the frame 155 a metallic platform 160. The metallic platform is a generally planar metallic plate-like structure that the crawler 120 can be magnetically held against while within the docking station, and that the crawler can maneuver off-of and back onto during use. For example, the crawler 120 could have magnetic wheels (as shown in FIG. 1) or a magnetized chassis that enable it to magnetically couple to the ferromagnetic platform 160. The frame 155 is also shaped to define at least one open side of the docking station, so as to allow the crawler to enter into or exit the docking station.

As an example, the platform 160 can be mounted to the frame 155 using a spring-biased mounting mechanism that provides for passive self-adjustment of the height of the platform relative to the frame depending on the contour of the surface of the asset 130. This mounting mechanism can allow the docking station to conform to assets that do not have uniformly flat surfaces (e.g., curved pipes) thereby facilitating the magnetic coupling between the docking station and the asset and enabling the robot to more easily drive off and on the platform 160. For instance, as shown in FIG. 1, the distal end of four support shafts 165 are coupled to the interior surface of the platform 160. The support shafts extend perpendicularly from the interior surface of the platform 160 (in the "normal" direction) toward the frame where they are coupled to the frame 155. Each shaft can be coupled to the frame 155 using a suitable mechanical coupling that allows the shaft to slide relative to the frame in the normal direction. For example, the coupling can comprise a linear bearing that allows the shaft to slide linearly therethrough (i.e., in the normal direction) and thus moving the platform closer to or further away from the frame 155.

In an embodiment, the sliding of the shafts 165 and thus movement of the platform relative to the frame can be biased or assisted using springs. For example, FIG. 1 depicts the frame 155 comprising four spring housings 170 that the four shafts 165 are respectively received within. The spring housings can each contain a compressed spring (not shown) configured to exert a force that urges a respective shaft out toward the platform 160.

Figure 2:
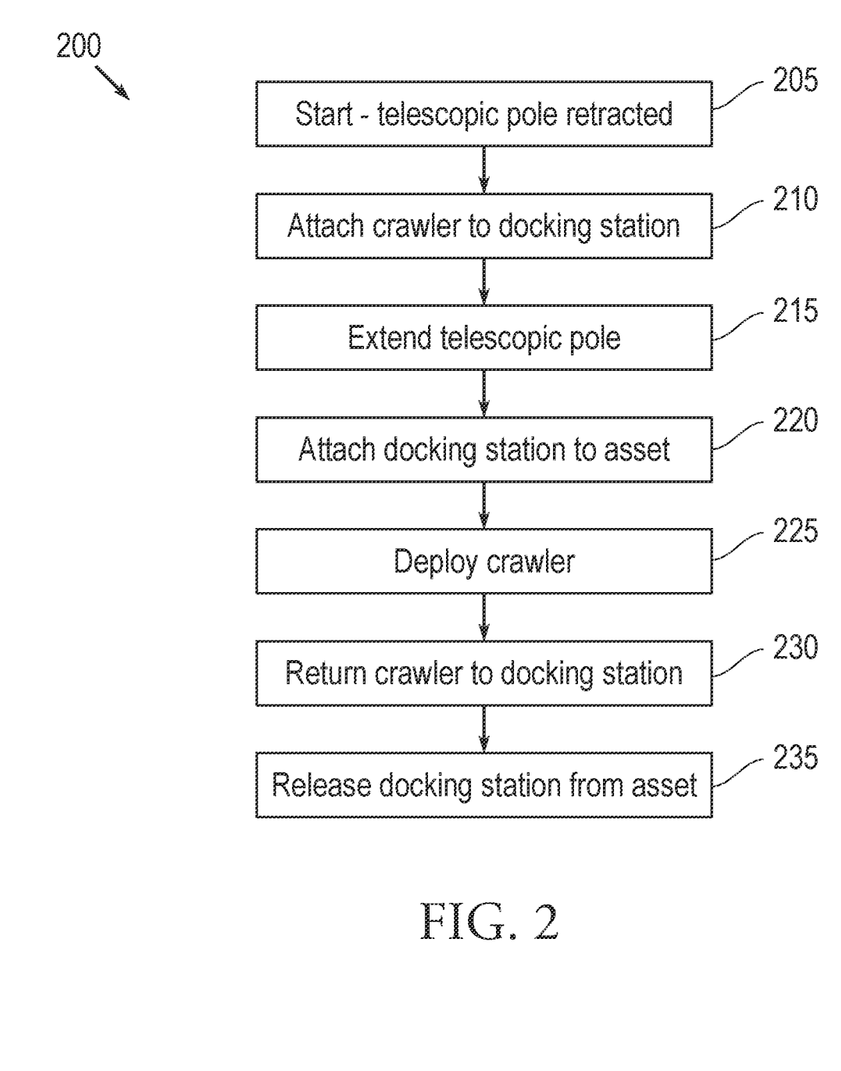
FIG. 2 is a process flow diagram of a routine for deploying a mobile robot in accordance with an embodiment of the present application.

FIG. 2 is a process flow diagram illustrating an example routine 200 for deploying a crawler 120 using the deployment system 100. The method 200 begins at step 205 with the pole in an initial retracted configuration. At step 210, the crawler is securely positioned with the docking station 150. For instance, the crawler can be magnetically secured and attached to the metal platform 160. At step 215, the telescopic pole 105 is extended in length and the docking station is positioned in proximity to the portion of the asset to be inspected. At step 220, the magnetic feet 180 of the docking station 150 are magnetically attached to the asset 130 by turning the switchable magnets 180 on. For instance, the switchable magnets can be turned on or off by the user or controller activating embedded servo motors that switch the switchable magnets on or off. Alternatively, the switchable magnets could be turned on and off mechanically by twisting the pole using a suitable mechanical linkage. Once the pole is attached to the asset, at step 225, the crawler is deployed for inspection. After completion of the inspection, at step 230, the crawler returns into the docking station and re-docks therewith by attaching magnetically to the platform 160. At step 235, the magnetic feet 180 are deactivated by the operator, for instance, by actuating the servos to turn off the switchable magnets. At this point, the telescopic pole can be moved to a different location, retracted back to its initial position, and one or more steps of routine 200 (e.g., steps 215-235) can be repeated.

Figure 3A:
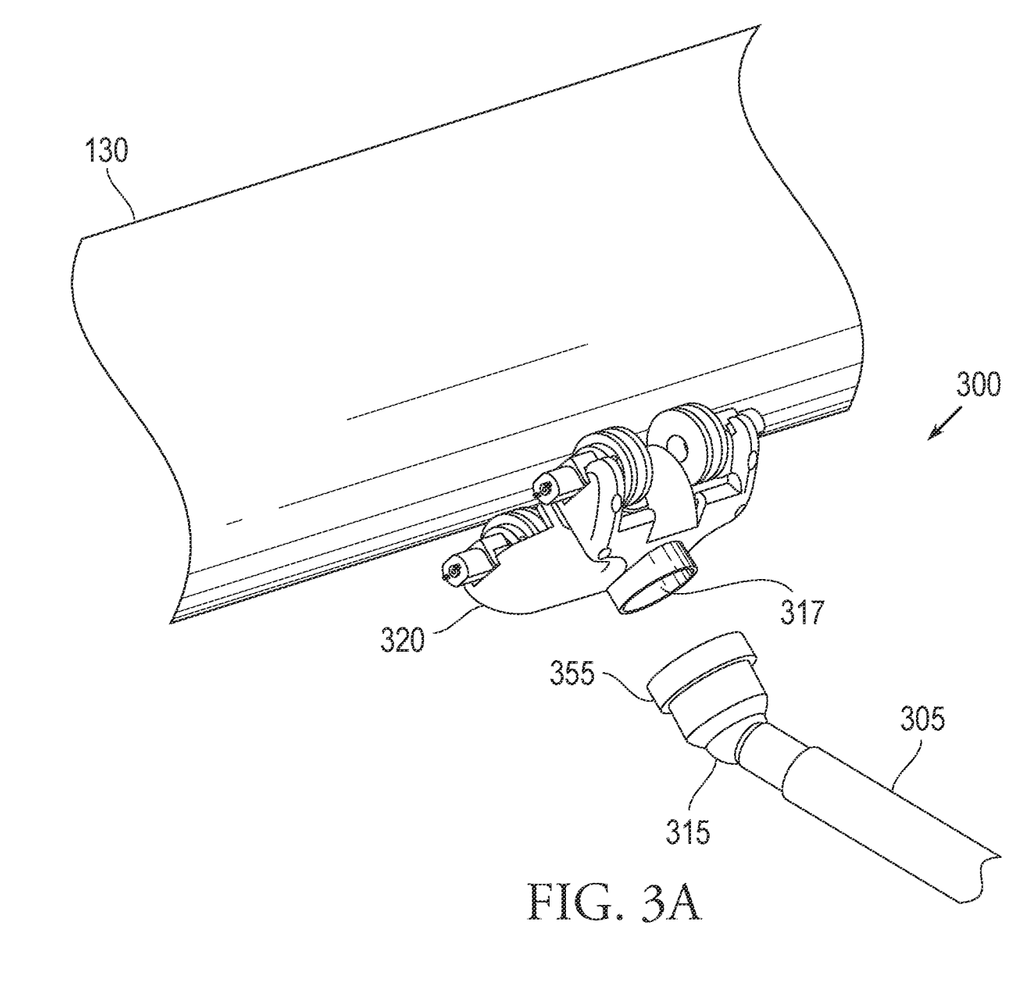
FIG. 3A is a perspective view of a mobile robot deployment system, including a telescopic pole and end-effector and a mobile robot in accordance with an embodiment of the present application.
Figure 3B:
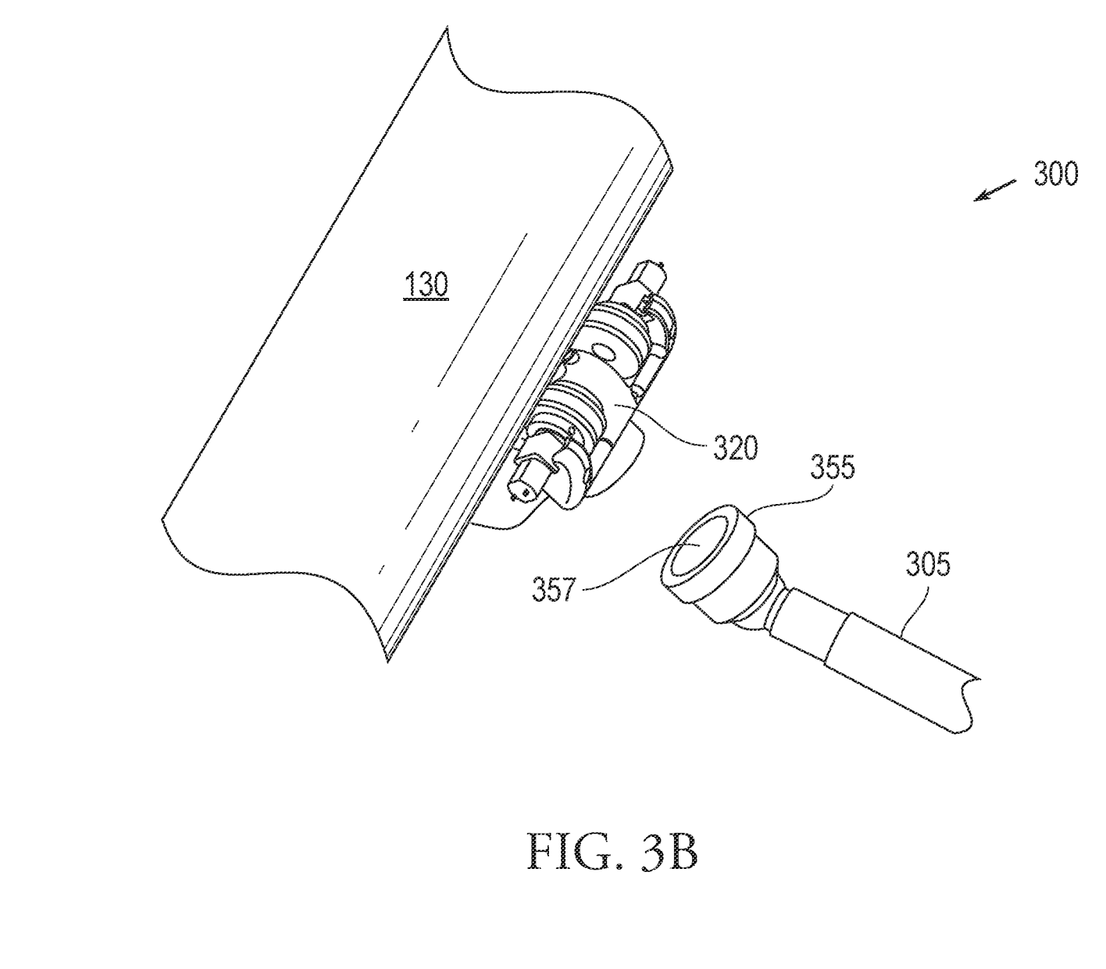
FIG. 3B is a perspective view of the mobile robot deployment system of FIG. 3A, including a telescopic pole and end-effector and a mobile robot in accordance with an embodiment of the present application.

Another example configuration of a mobile robot deployment system 300 is shown in FIGS. 3A-3B. The system 300 comprises a telescopic pole 305 having a similar configuration to the pole of system 100. System 300 further comprises an end-effector 355 that is coupled to the distal end of the pole 305 by way of a ball joint 315. System 300 can also comprise a crawler 320 configured to be selectively attached to or detached from the end-effector 355. In an embodiment, the top side of the crawler can comprise a magnet 317, a switchable magnet, or a magnetic receptive material (e.g., a ferrous material). The end effector 355 can comprise a switchable magnet 357. As shown in FIG. 3B, the switchable magnet 357 can be provided in the center of the end effector 355. Thus, the crawler 320 can be mounted to the end effector 355 so as to allow the crawler 320 to be positioned on an asset 130 by magnetically coupling the magnet 317 of the crawler with the switchable magnet 357. To deploy the crawler 320 using the system 300, the switchable magnets 357 can be turned off once the magnetic crawler is attached to the asset being inspected thereby detaching the end effector 355 from the crawler 320.

Figure 4:
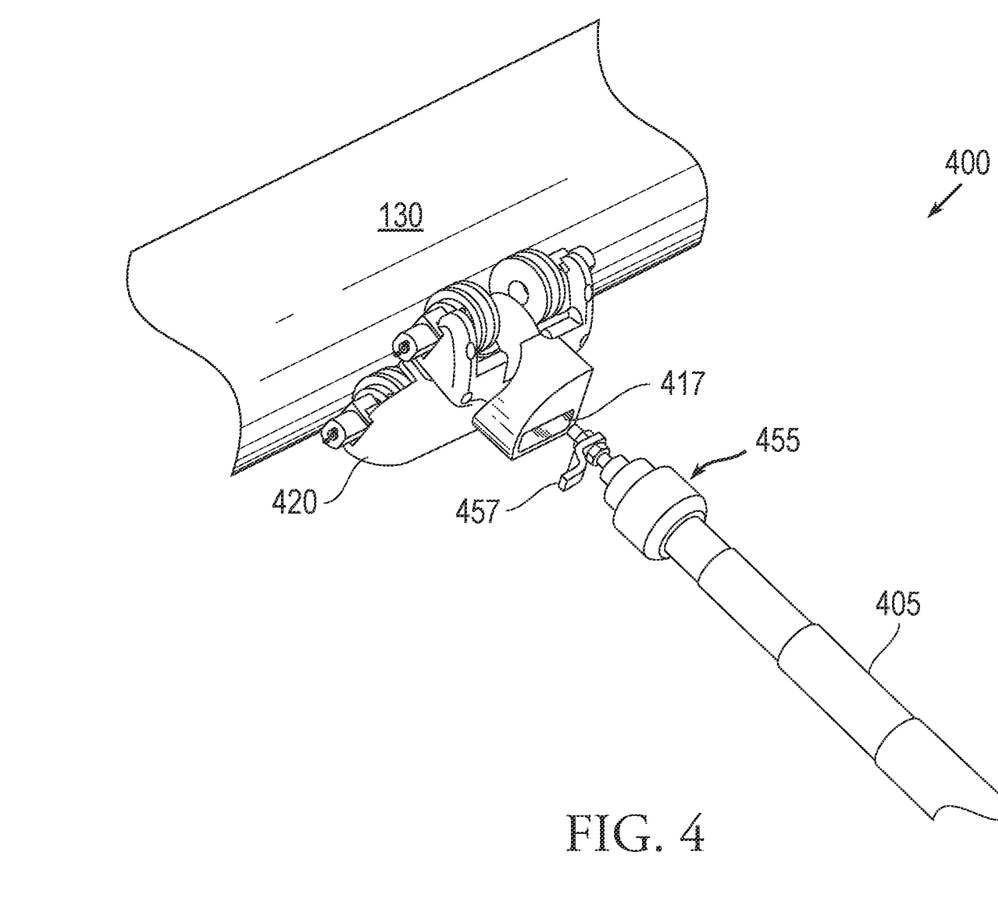
FIG. 4 is a perspective view of a mobile robot deployment system, including a telescopic pole and end-effector and a mobile robot in accordance with an embodiment of the present application.

Another example configuration of a mobile robot deployment system 400 is shown in FIG. 4. The system 400 comprises a telescopic pole 405 having a similar configuration to the pole of system 100. System 400 further comprises an end-effector 455 that is provided at the distal end of the pole 405. System 400 can also comprise a crawler 420 configured to be selectively attached to or detached from the end-effector 455 using a mechanical coupling mechanism. In an embodiment, the coupling mechanism can comprise a latch 457 provided at the distal end of the end effector 455 and the top side of the crawler can comprise a complementary slot 417 within which the latch 457 can be received. Thus, the crawler 420 can be mounted to the end effector 455 so as to allow the crawler 420 to be positioned on an asset 130 by inserting the latch with the slot and matingly engaging the latch and slot. To deploy the crawler 420 using the system 400, the latch can be actuated so as to disengage it from the slot 417, thereby releasing the crawler 420 from the end effector 455.

Figure 5:
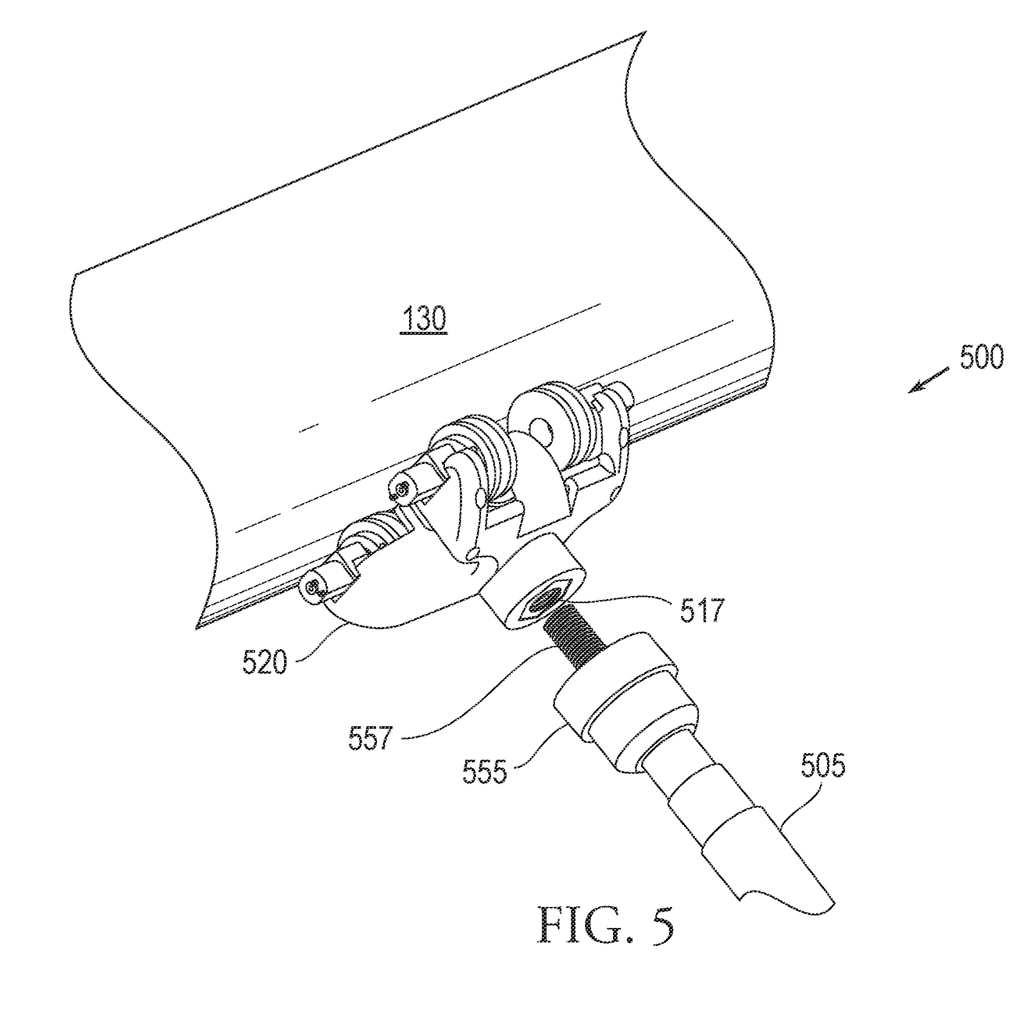
FIG. 5 is a perspective view of a mobile robot deployment system, including a telescopic pole and end-effector and a mobile robot in accordance with an embodiment of the present application.

As should be understood other types of user-actuated mechanical coupling mechanisms could be used to selectively attach or detach the crawler 420 and the end effector 455. Another example configuration of a mobile robot deployment system 500 is shown in FIG. 5. The system 500 comprises a telescopic pole 505 having a similar configuration to the pole of system 100. System 500 further comprises an end-effector 555 that is provided at the distal end of the pole 505. System 500 can also comprise a crawler 520 configured to be selectively attached to or detached from the end-effector 555 using a mechanical coupling mechanism. In an embodiment, the coupling mechanism can comprise a threaded bolt 557 extending from the distal end of the end effector 555. The coupling mechanism further comprises a complementary threaded nut 517 that is provided on the top side of the crawler and that the threaded bolt 557 can be threaded into. Thus, the crawler 520 can be mounted to the end effector 555 so as to allow the crawler 520 to be positioned on an asset 130 by inserting and threading the bolt 557 into the threaded nut 517. To deploy the crawler 520 using the system 500, the threaded bolt can be backed out of the threaded nut 517, thereby releasing the crawler 520 from the end effector 555. The bolt 557 can be threaded into or backed out of the threaded nut through manual rotation or motorized rotation of the bolt using a motor (not shown) provided within the pole 505 or end effector 555.

Figure 6:
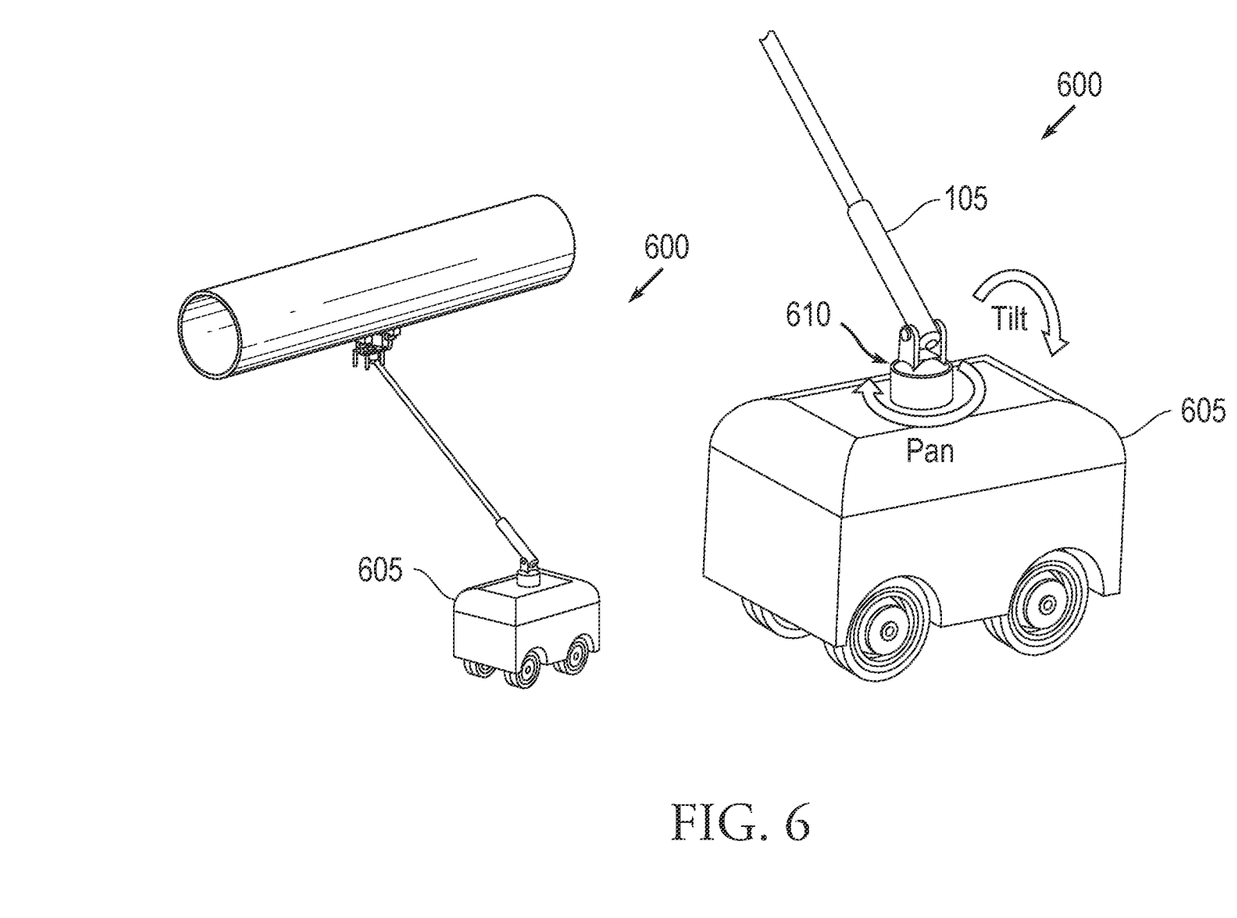
FIG. 6 is a perspective view of a mobile robot deployment system, including a telescopic pole, end-effector docking station, mobile robot, and a base carrier in accordance with an embodiment of the present application.

In an embodiment, to avoid needing a user to hold the telescoping pole, the telescopic pole can be mounted on a base carrier resting on the ground. FIG. 6 depicts a system 600 in which the exemplary pole 105, as shown and described in connection with FIG. 1, is mounted at a proximal end thereof to a base carrier 605. The base carrier 605 can provide a rolling base on wheels to assist with transporting the system from one location to another. The pole 105 can be attached to the base carrier 605 via a coupling 610 having one or more degrees of freedom. As shown in FIG. 6, the coupling 610 can be configured to provide multiple degrees of freedom. Preferably, the degrees of freedom include at least a first degree of freedom, tilt, and a second degree of freedom, pan and tilt, as these would provide sufficient adjustability for most scenarios. As shown, for example, the pole is mounted directly to the coupling 610 by a through-bolt so as to enable the pole to tilt relative to the coupling. Additionally, the coupling 610 can be rotatably mounted to a top surface of the base carrier 605 so as to provide the panning degree of freedom. To enable a long pole to be mounted stably onto the base carrier, a weighted counterbalance (not shown) can be provided inside the carrier for stability. Alternatively, stability can be achieved through a friction joint coupling the pole to the base carrier and a suitably heavy base carrier. In an embodiment, movement of the pole in the one or more degrees of freedom could be manually controlled. In an embodiment, movement of the pole in the one or more degrees of freedom could be actively controlled using a suitable motor and electronic controller provided within the base carrier. Such an automated positioning system can be configured to operate automatically or semi-automatically based on user controls input to the controller.

Figure 7:
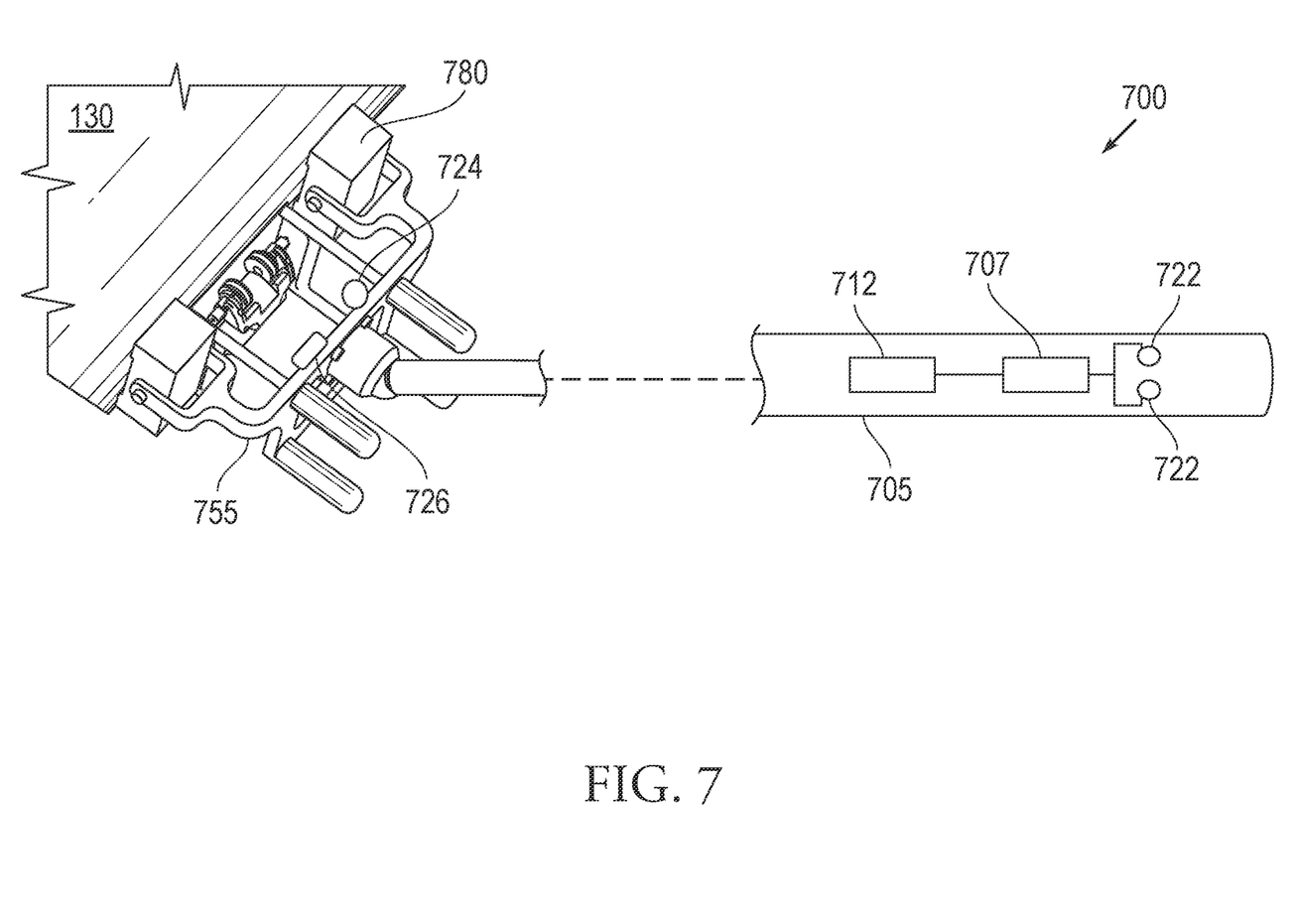
FIG. 7 is a perspective view of a mobile robot deployment system, including a telescopic pole and end-effector and a mobile robot in accordance with an embodiment of the present application.

In an embodiment, the telescopic pole can be configured to be a smart device. FIG. 7 depicts an exemplary configuration of a deployment system 700 including a telescopic pole 705 having a smart-device configuration. More specifically, pole 705 can be fitted with an electronic controller 707, such as a microcontroller, computer device or other suitable processing unit. Pole can also be fitted with one or more of a variety of sensors 724 that are in wired or wireless communication with the controller and that facilitate placement of the pole, effector and robot in proximity to the asset and facilitate automated or semi-automated operation of the pole. For instance, sensor 724 can be a sophisticated sensor system such as, a Light Detection and Ranging (LIDAR) sensor. By way of further example, other distance-measuring sensor technology can be used such as light, laser or ultrasonic proximity sensors. Thus, the control unit 707 can be configured to, based on the sensor data, automatically control one or more motors 712 arranged to, for example, elongate the pole and rotate the pole to align the end effector 755 with the asset 130 and attach it to the surface of the asset to be inspected. A camera sensor 726 can also be integrated into the head of the pole near the crawler such that it can be used to guide the pole's extension towards an asset for easy deployment.

As noted above, extending, manipulating and/or attaching the end effector to the asset can be performed manually, automatically by the controller, or semi-autonomously by the controller under command of an operator. For instance, the switchable magnetic feet 780 can be turned on or off by the user actuating the appropriate switches 722 connected to the controller 707. More specifically, the controller 707 can be configured to, in response to the user input, activate an embedded servo motor (not shown) that serves to switch the switchable magnets on or off. It should be understood various operations of the pole can controlled by the user via one or more user input devices (e.g., switches 722) that are communicatively coupled to the controller 707 including for example, extending the pole, rotating the end effector, actuating the end effector (e.g., latching/unlatching a latch, rotating the screw end, switching a magnet on/off) and the like.

Additionally, the controller 707 of the smart telescopic pole can comprise a wireless communication connection such that an operator can remotely control the pole 705 and other aspects of the system 700 system by transmitting control commands from a remote control station (not shown) over a communication link. These features could also be integrated into a base carrier (e.g., carrier 605) if needed. Furthermore, although pole 705 is fitted with a docking station 755 similar to the system described in FIG. 1, it should be understood that other example configurations of poles can similarly be fitted with sensors, electronic controllers, motors and the like.

The described techniques herein can be implemented using a combination of sensors, transmitters, and other devices including computing or other logic circuits configured (e.g., programmed) to carry out their assigned tasks. These devices are located on or in (or otherwise in close proximity to) the pole 705 or carrier base (not shown). In some example embodiments, the control logic is implemented as computer code configured to be stored on a computer-readable storage medium and executed on a computing circuit (such as a microprocessor) to perform the control steps that are part of the technique. For ease of description, this processing logic (e.g., ASIC, FPGA, processor, custom circuit, or the like) will be referred to as a controller throughout. For further ease of description, this control circuit will be programmable by code to perform the control logic (or otherwise customize the circuit to perform its intended purpose).

It should be understood that various combination, alternatives and modifications of the present embodiments could be devised by those skilled in the art. The present disclosure is intended to embrace all such alternatives, modifications and variances that fall within the scope of the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G, 4G or 5G cellular standards, or Bluetooth.

The terms "controller," "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the invention has been particularly shown and described with reference to a preferred embodiment thereof, it will be understood by those skilled in the art that various changes in form and details may be made therein without departing from the spirit and scope of the invention. Therefore, the scope of the invention is indicated by the appended claims, rather than by the foregoing description. All changes that come within the meaning and range of equivalency of the claims are to be embraced within their scope.

What is claimed is:

1. A system for deploying a magnetic robotic crawler onto a surface of an elevated asset, the crawler being of a type that is capable of magnetically attaching to and traversing the surface, the system comprising:
    an extendable pole having a proximal end and a distal end; and
    a docking station having a housing for receiving the crawler, the docking station provided at the distal end of the pole, and the docking station including magnetic feet mounted at a distal end of the housing, the feet configured to magnetically couple with the surface.

2. The system of claim 1, wherein the magnetic feet comprise switchable magnets configured to be switched on and off.

3. The system of claim 1, wherein the docking station is coupled to a distal end of the pole by a ball and socket joint.

4. The system of claim 1, wherein the docking station includes:
    a frame defining the housing having an interior volume, and
    a generally planar platform supported from the frame, the platform being composed of a ferromagnetic material and having a size sufficient to receive the robotic crawler therein, wherein the platform is positioned between the magnetic feet.

5. The system of claim 4, wherein the platform is mounted to the frame using a spring-biased mounting mechanism configured to provide for passive adjustment of a position of the platform relative to the frame when the mounting feet and platform are positioned against the asset and depending on a contour of the surface of the asset.

6. The system of claim 5, wherein the mounting mechanism comprises a plurality of shafts, wherein each shaft is joined at a distal end to an interior surface of the platform, extends away from the interior surface toward the frame, and has a proximal end that is moveably coupled to the frame by a coupling.

7. The system of claim 6, wherein the frame comprises a plurality of spring housings, wherein each of the plurality of spring housings is configured to receive a respective shaft among the that the plurality of shafts therein, and contains a compressed spring configured to exert a force that urges the respective shaft in a direction toward the platform.

8. The system of claim 1, wherein the extendable pole is a telescopic pole.

9. The system of claim 1, wherein the pole further comprises:
    a motor, a controller electrically connected to the motor, and a user input device connected to the controller, wherein the motor is configured to extend or retract the telescopic pole under control of the controller, and wherein the controller is configured to operate the motor in response to control inputs received from a user via the user input device.

10. The system of claim 9, wherein the pole further comprises one or more sensors in communication with the controller, wherein the controller is configured to operate the motor in response to inputs received from the one or more sensors.

11. The system of claim 10, wherein the one or more sensors is selected from the group consisting of: a light detection and ranging sensor, and an optical camera.

12. The system of claim 1, further comprising: a rolling base carrier configured to rest on ground, wherein the proximal end of the pole is mounted to the base using a base coupling configured to allow the pole to move relative to the base carrier with one or more degrees of freedom.

13. The system of claim 12, wherein the base coupling is configured to provide multiple degrees of freedom of movement relative to the base including tilt and rotation.

14. A system for deploying a magnetic robotic crawler onto a surface of an elevated asset, the crawler being of a type that is capable of magnetically attaching to and traversing the surface, the system comprising:
    an extendable pole having a proximal end and a distal end; and
    an end effector mounted to the distal end of the pole and configured to selectively attach to and detach from a complementary shaped receiver provided on a top side of the crawler.

15. The system of claim 14, wherein the end effector comprises a switchable magnet.

16. The system of claim 14, wherein the end effector comprises an actuatable latching mechanism configured to be received within a complementary shaped receiver provided on the robotic crawler.

17. The system of claim 14, wherein the end effector comprises a threaded bolt configured to be received within a complementary threaded nut provided on the robotic crawler.

18. The system of claim 14, further comprising:
the robotic crawler, the robotic crawler comprising the complementary shaped receiver.

\* \* \* \* \*